United States Patent [19]
Welters et al.

[11] Patent Number: 5,751,786
[45] Date of Patent: May 12, 1998

[54] X-RAY EXAMINATION APPARATUS COMPRISING A FILTER

[75] Inventors: Wilhelmus J. J. Welters; Jacob Wijdenes, both of Eindhoven, Netherlands

[73] Assignee: U.S. Philips Corporation, New York, N.Y.

[21] Appl. No.: 679,037

[22] Filed: Jul. 12, 1996

[30] Foreign Application Priority Data

Jul. 13, 1995 [EP] European Pat. Off. ............ 95201925
Mar. 5, 1996 [EP] European Pat. Off. ............ 96200581

[51] Int. Cl.⁶ .................................................. G21K 3/00
[52] U.S. Cl. ................................... 378/156; 378/158
[58] Field of Search .............................. 378/156, 157, 378/158, 159

[56] References Cited

U.S. PATENT DOCUMENTS 4,701,021 10/1987 Le Pesant et al. .................. 359/228

FOREIGN PATENT DOCUMENTS 2599886 12/1987 France .
2601493 1/1988 France ............................. 378/159

*Primary Examiner*—David P. Porta
*Attorney, Agent, or Firm*—Jack D. Slobod

[57] ABSTRACT

An X-ray examination apparatus (1) includes a filter (4) which is arranged between the X-ray source (2) and the X-ray detector (3). The X-ray filter includes a large number of filter elements (5); the X-ray absorptivity of the filter elements can be adjusted by controlling the quantity of X-ray absorbing liquid (6) than individual filter elements. The filter elements are formed by metal capillary tubes or the wall of the capillary tubes, or the wall of the capillary tubes is provided with a metal layer (7). On the metal layer there is provided a dielectric layer (8) and the dielectric layer is covered by a coating layer (9). The dielectric layer is, for example a glass, parylene or polystyrene layer. The coating layer is, for example a Teflon, silane or siloxane layer. The dielectric layer can be dispensed with when a Teflon coating layer is used.

20 Claims, 3 Drawing Sheets

X-RAY EXAMINATION APPARATUS COMPRISING A FILTER

BACKGROUND OF THE INVENTION

Field of the Invention

The invention relates to an examination apparatus including an X-ray source, an X-ray detector, and a filter which is arranged therebetween and comprises a plurality of filter elements having an X-ray absorptivity which can be adjusted by controlling a quantity of X-ray absorbing liquid within individual filter elements.

An X-ray examination apparatus of this kind is known from French Patent Application FR 2 599 886.

The known X-ray examination apparatus comprises a filter for limiting the dynamic range of an X-ray image, being the interval between the extremes of the brightness values. An X-ray image is formed on the X-ray detector by arranging an object, for example a patient to be examined, between the X-ray source and the X-ray detector and by irradiating said object by means of X-rays emitted by the X-ray source. If no steps are taken, a large dynamic range of the X-ray image may occur. On the one hand, for some parts of the object, for example lung tissue, the X-ray transmittance is high whereas other parts of the object, for example bone tissue, can hardly be penetrated by X-rays. Lead shutters used to intercept parts of the X-ray beam emitted by the X-ray source in order to shield parts of the object to be examined from the X-rays are reproduced with a uniform, very low brightness. Lead shutters are also used to ensure that X-ray, which do not pass through the object cannot reach the X-ray detector where they would cause blooming of the X-ray image. If no further steps are taken, therefore, an X-ray image is obtained with a large dynamic range whereas, for example medically relevant information in the X-ray image is embodied in brightness variations in a much smaller dynamic range; because it is not very possible to make small details of low contrast suitably visible in a rendition of such an X-ray image, the image is not very suitable for making a diagnosis. Furthermore, problems are encountered when such an X-ray image is picked up by means of an image intensifier/pick-up chain. An image intensifier/pick-up chain comprises an image intensifier tube for converting an incident X-ray image into an optical image and a video camera for deriving an image signal from the optical image. From regions with a very high or a very low brightness in the X-ray image, regions with a very high and a very low brightness, respectively, are formed in the optical image. If no further steps are taken, the dynamic range of the optical image could be larger than the range of brightness values that can be handled by the video camera without disturbing the image signal.

In order to limit the dynamic range of the X-ray image the known X-ray examination apparatus comprises a filter with filter elements provided with a bundle of parallel capillary tubes, each of which is connected, via a valve, to a reservoir containing an X-ray absorbing liquid which suitably wets the inner walls of the capillary tubes. In order to fill a capillary tube with the X-ray absorbing liquid, the valve of the relevant capillary tube is opened, after which the capillary tube is filled with the X-ray absorbing liquid by the capillary effect. Such a filled capillary tube has a high absorptivity for X-rays passing therethrough in a direction approximately parallel to its longitudinal direction. The valves are controlled so as to ensure that the quantity of X-ray absorbing liquid in the capillary tubes is adjusted so that filter elements in parts of the X-ray beam which pass through object parts of low X-ray absorptivity are adjusted to a high X-ray absorptivity and that filter elements in parts of the X-ray beam which pass through object parts of high X-ray absorptivity, or are intercepted by a lead shutter, are adjusted to a low X-ray absorptivity.

In order to change the setting of the filter of the known X-ray examination apparatus it is necessary to empty filled capillary tubes first. Therefore, use is made of a paramagnetic X-ray absorbing liquid which is removed from the capillary tubes by application of a magnetic field. After all capillary tubes have been emptied, the filter is adjusted anew by deactivation of the magnetic field and by subsequently opening valves of capillary tubes which are then filled with the X-ray absorbing liquid so as to adjust these tubes to a high X-ray absorptivity in the new filter setting.

It is a drawback of the known filter that it is not very possible to change the setting of the filter within a brief period of time, for example one second. Therefore, the known X-ray apparatus is not suitable for the formation of successive X-ray images at a high image rate where the setting of the filter is changed between the formation of successive X-ray images. Because it is necessary to empty all capillary tubes before the filter elements can be adjusted to new X-ray absorptivities and because the X-ray absorbing liquid suitably wets the inner wall of the capillary tubes so that emptying requires a substantial period of time, i.e. several seconds or even tens of seconds, a comparatively long period of time is required to switch over the known filter. Moreover, complete emptying of the capillary tubes by application of the magnetic field is not very well possible, because a film of X-ray absorbing liquid will stay behind on the inner walls of the capillary tubes.

It is a further drawback of the known filter that the construction with a separate mechanical valve for each of the capillary tubes is rather complex.

SUMMARY OF THE INVENTION

An object of the invention is to provide an X-ray examination apparatus which comprises a filter whose setting can be changed within a short period of time.

This object is achieved by means of an X-ray examination apparatus in accordance with the invention which is characterized in that individual filter elements comprise a wall provided with an electrically conducting layer, that a dielectric layer is deposited on the side of the electrically conducting layer which faces the interior of the relevant filter element, and that the dielectric layer is covered by a coating layer.

The quantity of X-ray absorbing liquid in individual filter elements is preferably controlled on the basis of an electric voltage applied to the relevant filter element. To this end, the X-ray examination apparatus comprises an adjusting circuit for applying said electric voltages to individual filter elements, said electric voltages enabling control of the (relative) quantity of X-ray absorbing liquid in individual filter elements. An electric voltage is to be understood to mean herein the electric potential difference between the filter element, notably the wall of the filter element, and the X-ray absorbing liquid. The filter elements may be provided with an electrically conducting layer, such as a metal layer deposited on a wall of the individual filter elements, but it is alternatively possible to utilize filter elements comprising metal electrically conducting walls, walls; in that case the metal layer is the surface of the wall itself.

The relative quantity of liquid is to be understood to mean herein the quantity of liquid in such a filter element in comparison with the quantity of liquid in the relevant filter element when it is completely filled with the liquid. The electric voltage applied to a filter element influences the adhesion between the X-ray absorbing liquid and the inner side of the relevant filter element and this adhesion determines the degree of filling of the filter element with the X-ray absorbing liquid. For example, for a first value of the electric voltage the adhesion of the inner side to the X-ray absorbing liquid is increased and the relevant filter element is filled with the X-ray absorbing liquid from a reservoir. For a second value of the electric voltage the adhesion is reduced and the X-ray absorbing liquid is drained from the filter element to the reservoir. Filter elements are adjusted to a high X-ray absorptivity by filling with X-ray absorbing liquid, the filter elements are adjusted to a low X-ray absorptivity by draining them.

Only a very short period of time, no more than a few tenths of a second, is required to change the electric voltages applied to the individual filter elements, and the relative quantity of X-ray absorbing liquid in the filter element will have changed briefly after the changing of the electric voltages, so that changing the setting of the filter requires little time only, i.e. less than one or a few seconds. Furthermore, it is not necessary to empty all filter elements between two settings of the filter. This is because per filter element the electric voltage, and hence the relative quantity of X-ray absorbing liquid, can be increased or decreased as desired. It has been found that the setting of the filter can be changed within a period of time of between 0.1 s and 3 s.

In a capillary tube filled with the X-ray absorbing liquid the liquid surface encloses an angle with respect to the inner side of the tube; this angle, referred to as contact angle or edge angle, is a measure of the adhesion of the X-ray absorbing liquid. The X-ray absorbing liquid encloses a contact angle of at least 90° with respect to a hydrophobic surface. Notably the so-called receding contact angle is important. It appears that the contact angle upon filling of the filter element, the so-called advancing contact angle, and the contact angle upon emptying of the filter element, the so-called receding contact angle, are different. It has been found in practice that the receding contact angle is smaller than the advancing contact angle. If the advancing contact angle is larger than 90°, as is certainly the case if the receding contact angle is larger than 90°, hardly any or no X-ray absorbing liquid can penetrate into the relevant filter element; however, if the advancing contact angle drops below 90°, the relevant filter element is (partly) filled with the X-ray absorbing liquid. In order to ensure that said contact angle varies, as a function of the applied electric voltage, in a range of values which includes the contact angle value 90°, the coating layer having suitable hydrophobic/hydrophilic properties is provided. Preferably, the coating layer is chosen so that if no electric voltage is applied to the metal wall of the relevant filter element, the contact angle has a value greater than 90° and that when an electric voltage is applied, the contact angle drops sufficiently far below 90° to ensure that the relevant filter element is quickly filled with X-ray absorbing liquid. The dielectric layer ensures that the electrical capacitance of the individual filter elements remains low enough to enable a fast response to the application or variation of the electric voltage. When a separate dielectric layer and a separate coating layer are used, it is ensured that suitable compositions and configurations of the respective layers can be chosen for the respective functions of the dielectric layer and the coating layer. The dielectric layer may in principle be an arbitrary electrically insulating layer.

A preferred embodiment of an X-ray examination apparatus in accordance with the invention is characterized in that individual filter elements are formed by metal capillary tubes.

A small variation of the electric voltages applied to the inner side of such capillary tubes by the adjusting circuit already causes a large and fast change of the degree of filling of the capillary tubes with the X-ray absorbing liquid. It is comparatively simple to manufacture metal capillary tubes and to provide the dielectric layer and the coating layer on the inner wall of such tubes.

A further preferred embodiment of an X-ray examination apparatus in accordance with the invention is characterized in that the coating layer is a hydrophobic layer.

Such a hydrophobic coating layer ensures that when no electric voltage is applied to the relevant filter element, the contact angle between the X-ray absorbing liquid and the coating layer is substantially larger than 90°. The contact angle is maximum in the presence of the electric voltage for which the interface between the X-ray absorbing liquid and the coating layer is not charged; it has been found in practice that this is the case in the presence of an electric voltage amounting to substantially zero. The contact angle is reduced by application of an electric voltage; in the case of a sufficiently high electric voltage, the contact angle is reduced to a value to below 90° and the relevant filter element is then at least partly filled with the X-ray absorbing liquid. By choosing a hydrophobic coating layer it is achieved that the filter elements, for example in the form of capillary tubes, are not filled with the X-ray absorbing liquid if no electric voltage is applied to the relevant filter element. By application of an electric voltage to such a filter element the contact angle is reduced to a value below 90°, so that the hydrophobicity is canceled. If no electric voltage is applied to a filter element, the relevant filter element hardly has any X-ray absorptivity. By choosing the coating layer to be hydrophobic it is achieved that hardly any or no unintended residues of X-ray absorbing liquid remain in the filter elements when no electric voltage is applied to the respective filter elements. Therefore, it is not necessary to take special steps so as to empty filter elements if desired. Undesirable (background) X-ray absorption by the filter is thus simply counteracted. Furthermore, if the coating layer isolates the metal layer from the X-ray absorbing liquid, electrolysis of the X-ray absorbing liquid is counteracted. This can be achieved by utilizing a coating layer which is impervious to the X-ray absorbing liquid.

A further preferred embodiment of the X-ray examination apparatus in accordance with the invention is characterized in that the dielectric layer is impervious to the X-ray absorbing liquid.

Using such an impervious dielectric layer it is achieved that the X-ray absorbing liquid cannot reach the metal wall of a relevant filter element. It is thus ensured that the applied electric voltage difference between the metal wall and the X-ray absorbing liquid is sustained. If direct contact were to occur between the metal wall and the X-ray absorbing liquid, it would be impossible to build up an electric voltage difference between the metal wall and the X-ray absorbing liquid. Moreover, such an impervious dielectric layer counteracts an electrolysis of the X-ray absorbing liquid. Furthermore, it is possible to choose a coating layer having suitable hydrophobic properties, irrespective of whether or not such a coating layer has a suitable sealing effect.

A further preferred embodiment of an X-ray examination apparatus in accordance with the invention is characterized in that the relative dielectric constant of the dielectric layer has a value in the interval [1,20], preferably in the interval [2,10].

Using a dielectric layer having a relative dielectric constant which is larger than 1, and preferably 2 or more but not more than 20, preferably at the most 10, it is ensured that the electrical capacitance of the dielectric layer is high enough so as to achieve the desired short response time. Furthermore, such a thin dielectric layer having such a high relative dielectric constant yields a high sensitivity of the relative filling to the applied electric voltage; this means that even when only a small voltage difference is applied, a high relative filling of the relevant filter element is already achieved. If the relative dielectric constant is not too high, a low electrical capacitance can be achieved by means of a thin dielectric layer. The thinner the dielectric layer, for example thinner than 10 μm, the less the background X-ray absorption of the X-ray filter will be. If the relative dielectric constant may amount to 2 or more, a wider choice from materials for forming the dielectric layer is possible.

A further preferred embodiment of an X-ray examination apparatus in accordance with the invention is characterized in that the dielectric layer consists mainly of glass.

Glass is a suitable material for forming the dielectric layer. This is because glass has suitable dielectric properties, such as a relative dielectric constant having a value in said preferred range. Furthermore, glass is particularly well capable of withstanding X-rays and hardly absorbs X-rays. Moreover, glass can be comparatively easily deposited as a comparatively thin layer on a metal surface. The fact that glass is a hydrophilic material is not problematic, because the dielectric glass layer is covered by the coating layer which is hydrophobic. Furthermore, glass is a suitable material for the dielectric layer because coating layers of a variety of materials, such as polytetrafluoroethylene (PTFE), silane or siloxane can be suitably bonded thereto. Polytetrafluoroethylene is also known as Teflon. In addition to polytetrafluoroethylene other polyfluorohydrocarbons are also suitable for forming the coating layer. Polyfluorohydrocarbons are to be understood to mean hydrocarbon polymers formed by a monomer in which at least one of the hydrogen atoms has been replaced by a fluorine atom.

A further preferred embodiment of an X-ray examination apparatus in accordance with the invention is characterized in that the coating layer consists mainly of silane or siloxane.

Silanes as well as siloxanes are suitably capable of withstanding X-rays and can be suitably bounded to glass. The coating layer of such a material also has suitable hydrophobic properties. The receding contact angle of a siloxane coating layer amounts to from approximately 94° to 96°, i.e. substantially more than the critical value of 90°, but the difference with respect to said critical value is small enough so as to reduce the contact angle to less than 90° by application of an electric voltage. Suitable results are obtained notably by means of polydimethylsiloxane. Various silanes, such as octadecyldimethylchlorosilane, have a receding contact angle of approximately 98° which is still sufficiently close to the critical value of 90°. It has also been found that notably polydimethylsiloxane is suitably capable of withstanding X-rays used in medical diagnostics.

A further preferred embodiment of an X-ray examination apparatus in accordance with the invention is characterized in that the dielectric layer consists mainly of parylene or polystyrene.

Parylene can be simply deposited by means of a chemical vapor deposition process (CVD). Polystyrene can be applied simply from a solution. Both materials have suitable dielectric properties.

A further preferred embodiment of an X-ray examination apparatus in accordance with the invention is characterized in that the coating layer consists mainly of polyfluorohydrocarbon.

Polyfluorohydrocarbon, such as Teflon, can be suitably bonded to parylene and to polystyrene. Furthermore, polyfluorohydrocarbon, notably Teflon, also has the appropriate hydrophobicity.

A further preferred embodiment of an X-ray examination apparatus in accordance with the invention is characterized in that a bonding layer is provided between the dielectric layer and the coating layer and/or the metal layer.

The bonding layer, for example, can be suitably bonded to the dielectric layer on the one hand; and on the other hand, the coating layer can be suitably bonded to the bonding layer. The use of the bonding layer enables the use of a dielectric layer and a coating layer consisting of materials which themselves do not properly adhere. The coating layer and the dielectric layer can thus be chosen independently of their mutual bonding properties. It is also possible to use a bonding layer between the metal layer and the dielectric layer, the bonding layer being suitably bondable to the metal layer and the dielectric layer suitably bondable to the bonding layer. The dielectric layer can then be chosen without taking into account the bonding properties between the metal layer and the dielectric layer. Polyacrylates, for example, are suitable materials for the bonding layer.

An X-ray examination apparatus in accordance with the invention is characterized in that individual filter elements comprise a wall provided with a metal layer, and that a polyfluorohydrocarbon coating layer is provided on the side of the metal layer which faces the interior of the relevant filter element.

When a polyfluorohydrocarbon coating layer is used, for example of Teflon, no dielectric layer is required because the polyfluorohydrocarbon itself already has the desired dielectric property. Furthermore, polyfluorohydrocarbons, notably Teflon, are impervious to the X-ray absorbing liquid. Consequently, a comparatively high electric direct voltage, for example higher than 1 V, can be used for controlling the relative quantity of X-ray absorbing liquid in individual filter elements, without giving rise to electrolysis of the X-ray absorbing liquid.

These and other aspects of the invention will be apparent from and—elucidated with reference to the embodiments described hereinafter.

DETAILED DESCRIPTION OF THE PREFERRED EMBODIMENTS

Figure 1:
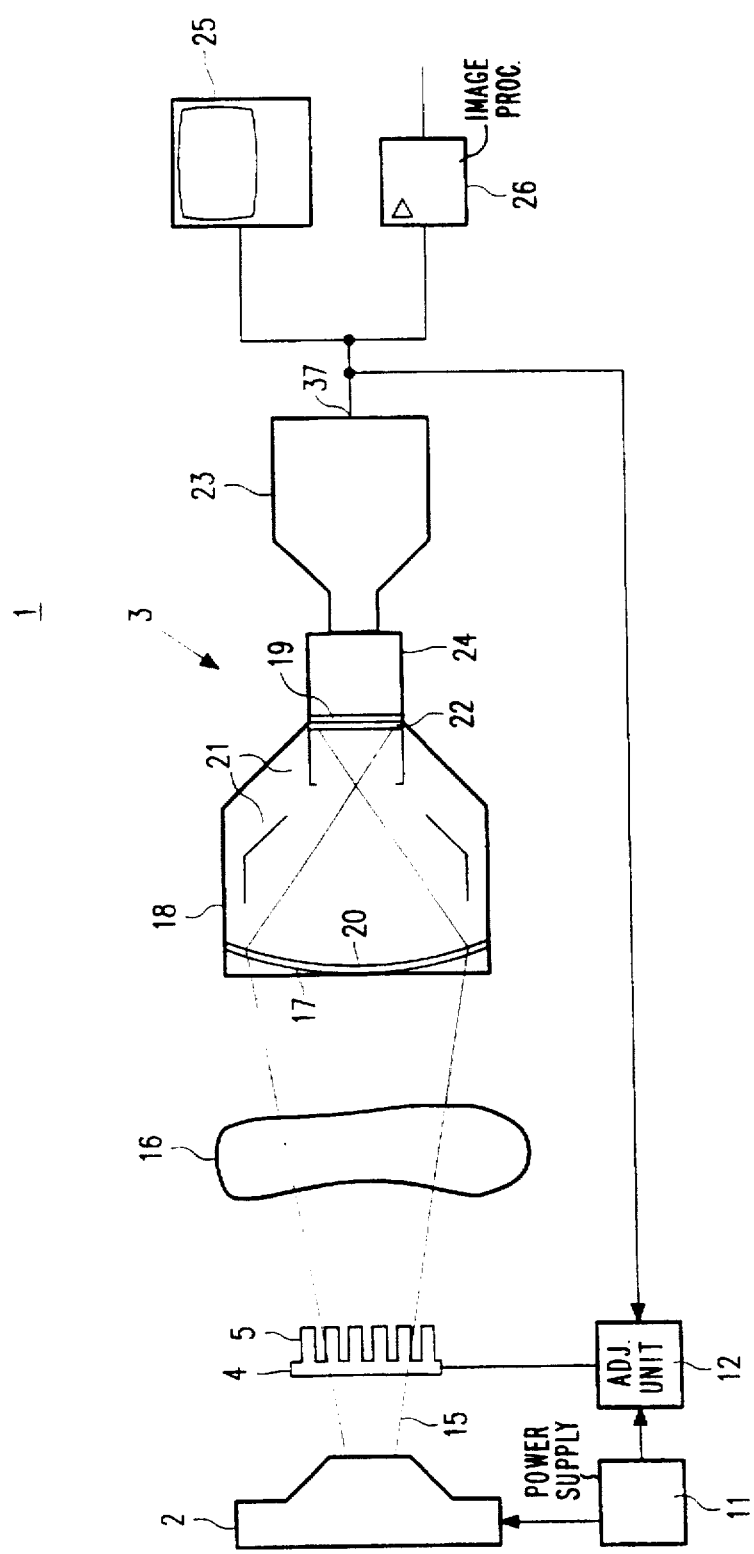
FIG. 1 is a diagrammatic representation of an X-ray examination apparatus in accordance with the invention.

FIG. 1 shows diagrammatically an X-ray examination apparatus 1 in accordance with the invention. The X-ray source 2 emits an X-ray beam 15 for irradiating an object 16. Due to differences in X-ray absorption within the object 16, for example a patient to be radiologically examined, an image is formed on an X-ray sensitive surface 17 of the X-ray detector 3 which is arranged opposite the X-ray source. The X-ray detector 3 of the present embodiment is formed by an image intensifier/pick-up chain which includes an X-ray image intensifier 18 for converting the X-ray image into an optical image on an exit window 19 and a video camera 23 for picking up the optical image. The entrance screen 20 acts as the X-ray sensitive surface of the X-ray image intensifier which converts X-rays into an electron beam which is imaged on the exit window by means of an electron-optical system 21. The incident electrons generate the optical image on a phosphor layer 22 of the exit window 19. The video camera 23 is coupled to the X-ray image intensifier 18 by way of an optical coupling 24, for example a lens system or a fiber-optical coupling. The video camera 23 extracts an image signal, for example an electronic video signal, from the optical image; this image signal is applied to a monitor 25 in order to display the image information in the X-ray image. The image signal may also be applied to an image processing unit 26 for further processing.

Between the X-ray source 2 and the object 16 there is arranged the X-ray filter 4 for local attenuation of the X-ray beam. The X-ray filter 4 comprises a large number of filter elements 5 in the form of capillary tubes whose X-ray absorptivity can be adjusted by application of an electric voltage, referred to hereinafter as the adjusting voltage, to the inner side of the capillary tubes by means of the adjusting unit 12. The adhesion of the X-ray absorbing liquid to the inner side of the capillary tubes can be adjusted by means of an electric voltage which can be applied to a metal layer 7, i.e. an electrically conductive layer, on the inner side of the capillary tubes S. The capillary tubes communicate at one end with a reservoir 30 for an X-ray absorbing liquid. The capillary tubes are filled with a given quantity of X-ray absorbing liquid as a function of the electric voltage applied to the individual tubes. Because the capillary tubes extend approximately parallel to the X-ray beam, the X-ray absorptivity of the individual capillary tubes is dependent on the relative quantity of X-ray absorbing liquid in such a capillary tube. The electric adjusting voltage applied to the individual filter elements is adjusted by means of the adjusting unit 12, for example on the basis of brightness values in the X-ray image and/or the setting of the X-ray source 2; to this end, the adjusting unit is coupled to the output terminal 40 of the video camera and to the power supply 11 of the X-ray source 2. The construction of an X-ray filter 4 of this kind and the composition of the X-ray absorbing liquid are described in detail the international Application No. 96/13040.

Figure 2:
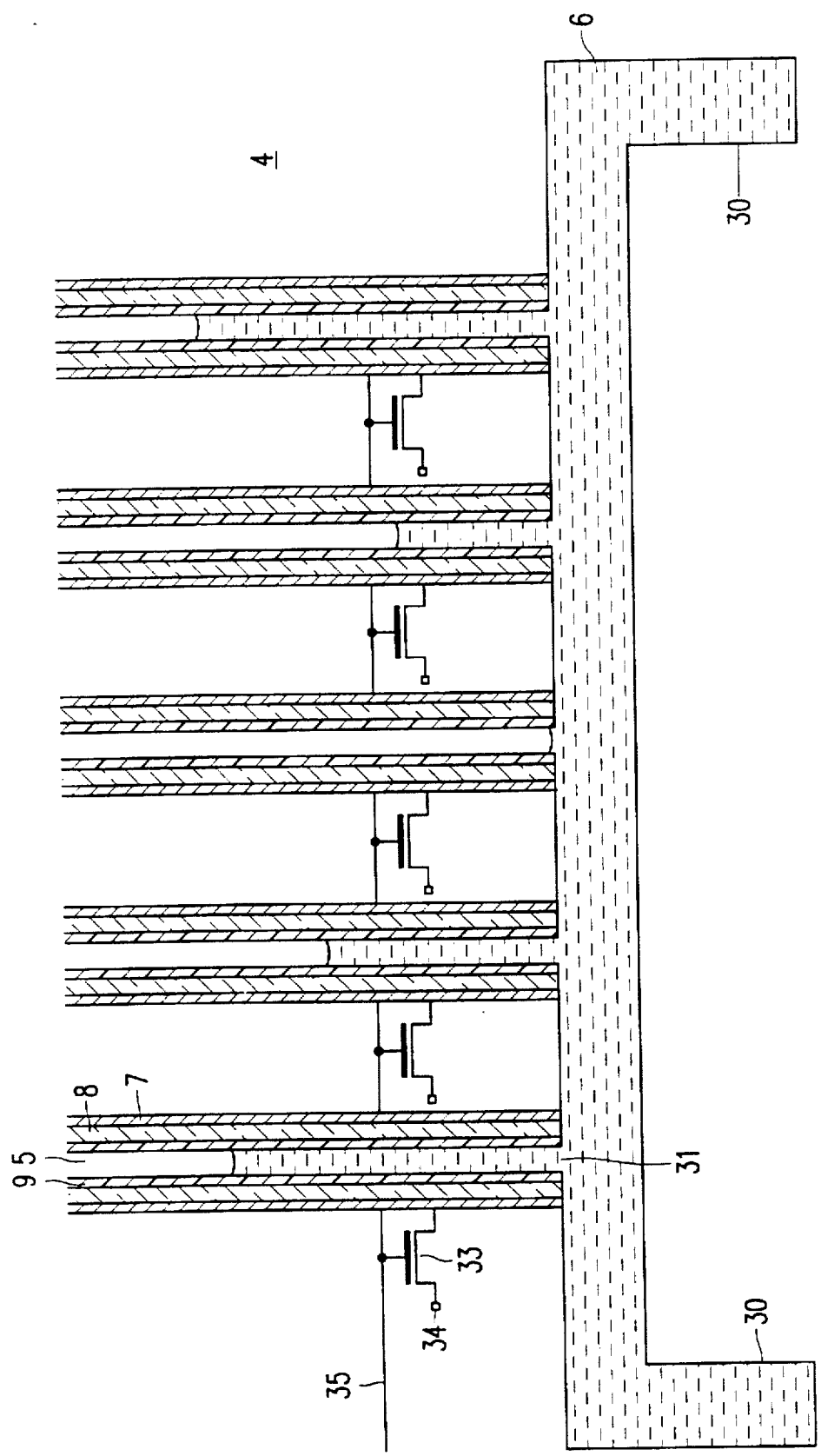
FIG. 2 is a side elevation of an X-ray filter of the X-ray examination apparatus shown in FIG. 1.

FIG. 2 is a side elevation of an X-ray filter 4 of the X-ray examination apparatus of FIG. 1. The Figure shows five capillary tubes by way of example, but a practical embodiment of an X-ray filter 4 of an X-ray examination apparatus in accordance with the invention may comprise a large number of capillary tubes, for example 40,000 capillary tubes in a 200×200 matrix arrangement. Each of the capillary tubes 5 communicates with the X-ray absorbing liquid 6 via an end 31. The inner side of the capillary tubes is covered by an electrically conductive layer 7, for example of gold or platinum or ITO, which layer 7 is coupled to a voltage line 34 via a switching element 33. For application of the electric adjusting voltage to an electrically conductive layer 7 of a capillary tube, the relevant switching element 33 is closed while the voltage line 34, which thus electrically contacts the capillary tube, is adjusted to the desired electric adjusting voltage. The switching elements are driven via a control line 35. When brief voltage pulses having a duration of a few tens of microseconds are used, adjusting voltages in a range of from 0 V to 400 V can be used. If the voltage pulses are short or if use is made of a direct voltage of up to approximately 1 V, no or hardly any electrolysis of the X-ray absorbing liquid will occur. A direct voltage higher than approximately 1 V can be used when the X-ray absorbing liquid is isolated from the metal layer, for example by the dielectric layer or the coating layer, so that electrolysis of the X-ray absorbing liquid is avoided. In the voltage range of from 0 V to 400 V use can be made of switches in the form of α-Si thin-film transistors. Preferably, an adjusting voltage in the range of from 30 V to 100 V is used. The X-ray absorptivity of the individual capillary tubes can be controlled on the basis of the period of time during which the electric adjusting voltage is applied to the capillary tubes. Each of the capillary tubes, notably the conductive layer 7 and the X-ray absorbing liquid in the capillary tube, constitutes a capacitor. During the filling of such a capillary tube with the X-ray absorbing liquid the capacitance of said capacitor varies as a function of the level of the liquid in the capillary tube or, in other words, as a function of the relative filling of said capillary tube. The charging of the capacitor produces electric energy for filling the capillary tube with the X-ray absorbing liquid. The longer the electric adjusting voltage remains applied, the further the capacitor is charged and the more the tube is filled with the X-ray absorbing liquid. On the electrically conductive layer 7 there is preferably provided a dielectric layer 8 of a thickness which suffices to ensure that the electric capacitance of the capillary tubes remains low enough to enable fast response to the application of the electric voltage. The dielectric layer 8 preferably has a thickness of between 2 μ and 10 μm. In order to ensure that the contact angle between the X-ray absorbing liquid and the inner side of the capillary tubes varies, as a function of the applied electric voltage, in a range of values which includes the contact angle value 90°, for example a coating layer 9 having suitable hydrophilic/hydrophobic properties can be provided on the dielectric layer. Suitable materials for the dielectric layer 8 are parylene which can be provided by vapor deposition, glass coatings which can be deposited from the liquid phase, electrophoretic lacquer which can be deposited by electrophoresis, or soluble polymers such as polystyrene, polyethylene or polymethylacrylate which can be deposited from a solution. The coating layer 9 is provided on the dielectric layer 8. The coating layer 9 may be very thin; if desired, the coating layer 9 may be a molecular monolayer. Suitable hydrophobic properties are obtained by means of coating layers whose surface is composed of $CF_3$, $CF_2$, $CH_3$ or $CH_2$ groups. Notably polydimethylsiloxane or monolayers of octadecyltrichlorosilane or of perfluoroalkalkylsilane are suitable for forming the coating layer 9. In order to enhance the bonding between the dielectric layer 8 and the coating layer 9, a bonding layer of, for example polyacrylate may be provided between the dielectric layer 8 and the coating layer 9 or the metal layer 7.

Use is preferably made of metal capillary tubes whose inner side is covered by successively the dielectric layer 8 and the coating layer 9. The electric voltage can then be applied to the metal of the tubes. The manufacture of such a construction is easier than providing glass capillary tubes with a metal coating. When a Teflon layer is used as the coating layer 9 covering the inner side of a metal tube, a separate dielectric layer can be dispensed with.

Figure 3:
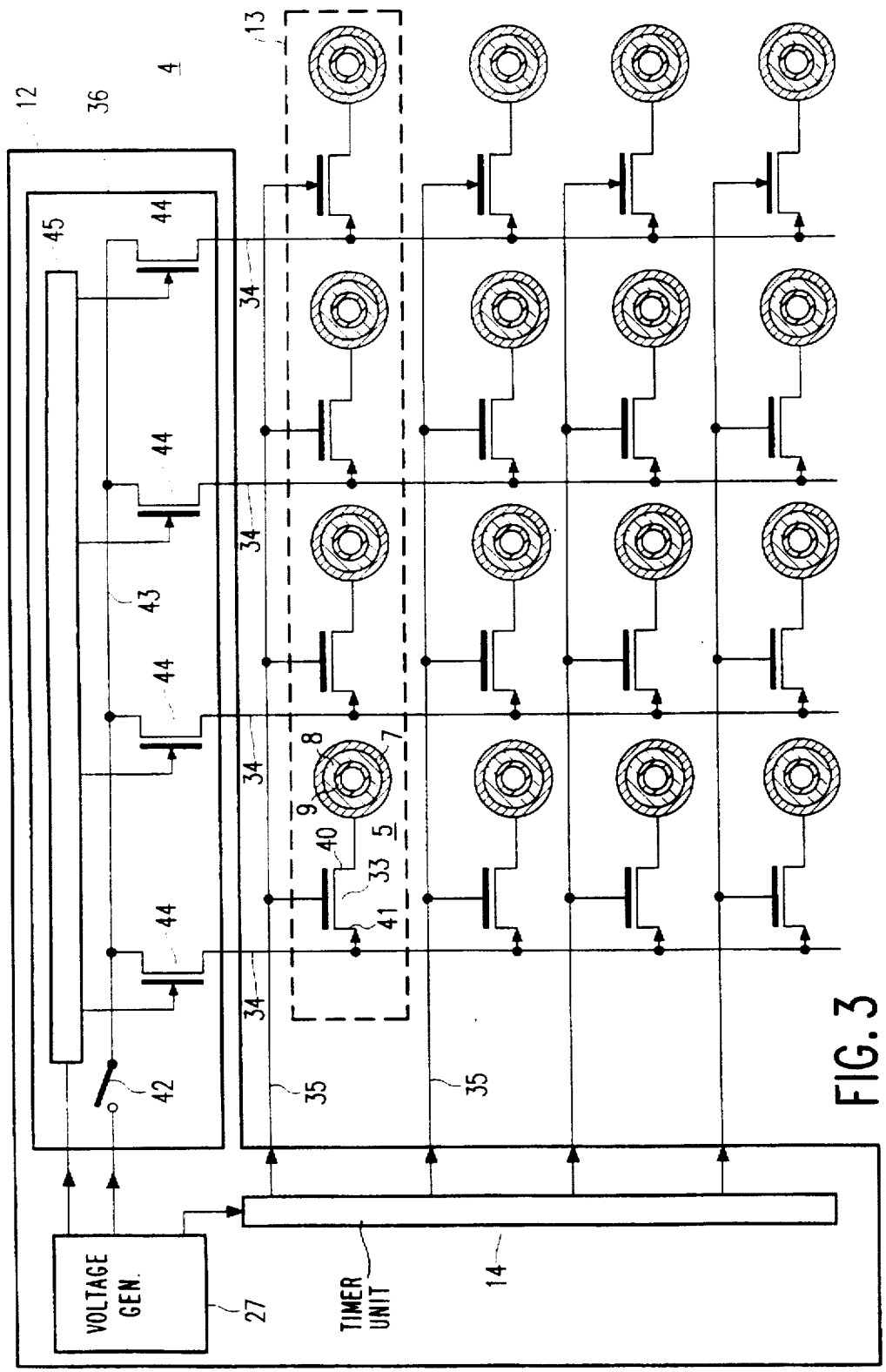
FIG. 3 is a plan of an X-ray filter of the X-ray examination apparatus shown in FIG. 1.

FIG. 3 is a plan view of an X-ray filter 4 of the X-ray examination apparatus shown in FIG. 1. An X-ray filter 4 comprising 16 capillary tubes in a 4×4 matrix arrangement is shown by way of example; however, in practice the X-ray filter 4 may comprise a much larger number of capillary tubes, for example 200×200 tubes. Each of the capillary tubes is coupled, by way of the electrically conductive layer 7, to the drain contact 40 of a field effect transistor 33 which acts as a switching element and whose source contact 41 is coupled to a voltage line. For each row 13 of capillary tubes there is provided a control line 35 which is coupled to the gate contacts of the field effect transistors in the relevant row in order to control the field effect transistors in this row. The control line 35 of the relevant row is energized by an electric control voltage pulse so as to apply an adjusting voltage to the electrically conductive inner side of the capillary tubes in the row, so that the field effect transistors in the relevant row are electrically turned on during the control voltage pulse. The adjusting unit 12 comprises a voltage generator 27 for applying an electric voltage to the timer unit 14 which applies the control voltage pulses of the desired duration to the individual control lines of the rows of capillary tubes. While the relevant field effect transistors are turned on, i.e. the switching elements are closed, the electric adjusting voltage of the relevant control lines 34 is applied to the capillary tubes. The periods of time during which the electric adjusting voltage is applied to individual capillary tubes in a row can be differentiated by application of the electric adjusting voltage to the respective voltage lines 34 of individual columns for different periods of time. To this end, the adjusting unit 7 comprises a column driver 36 which controls a period during which the electric adjusting voltage generated by the voltage generator 27 is applied to the individual voltage lines. The electric adjusting voltage is applied to a contact 43 via a switch 42. Each of the voltage lines 34 is coupled to a respective switching element, for example a transistor 44, by way of the contact 43. When the transistor 44 of the voltage line 34 is turned on by energizing the gate contact of the relevant transistor by means of a gate voltage, the adjusting voltage is applied to the voltage line. The gate contacts of the transistors 44 are coupled, via a bus 45, to the voltage generator 27 which supplies the gate voltage. The period of time during which the individual voltage lines are energized by the adjusting voltage is controlled by way of the period during which the gate voltages are applied to the gate contacts of the individual transistors 44.

The effective surface area with adhesion to the X-ray absorbing liquid is enlarged by providing filter elements with a plurality of capillary tubes. Evidently, in that case the quantities of X-ray absorbing liquid in capillary tubes of one and the same filter element, which can be coupled to one and the same transistor in their control line, cannot be separately controlled.

We claim:

1. An X-ray examination apparatus, comprising an X-ray source (2), an X-ray detector (3), and a filter which is arranged therebetween and comprises a plurality of filter elements having an X-ray absorptivity which can be adjusted by controlling a quantity of X-ray absorbing liquid within individual filter elements, characterized in that individual filter elements comprise a wall provided with an electrically conducting layer, a dielectric layer is deposited on the side of the electrically conducting layer which faces the interior of the relevant filter element, and the dielectric layer is covered by a coating layer.

2. An X-ray examination apparatus as claimed in claim 1, characterized in that individual filter elements are formed by metal capillary tubes.

3. An X-ray examination apparatus as claimed in claim 2, characterized in that the dielectric layer consists mainly of glass.

4. An X-ray examination apparatus as claimed in claim 2, characterized in that the coating layer is a hydrophobic layer.

5. An X-ray examination apparatus as claimed in claim 4, characterized in that the dielectric layer is impervious to the X-ray absorbing liquid.

6. An X-ray examination apparatus as claimed in claim 4, characterized in that the dielectric layer consists mainly of glass.

7. An X-ray examination apparatus as claimed in claim 2, characterized in that the dielectric layer is impervious to the X-ray absorbing liquid.

8. An X-ray examination apparatus as claimed in claim 7, characterized in that the dielectric layer consists mainly of glass.

9. An X-ray examination apparatus as claimed in claim 1, characterized in that the coating layer is a hydrophobic layer.

10. An X-ray examination apparatus as claimed in claim 9, characterized in that the dielectric layer is impervious to the X-ray absorbing liquid.

11. An X-ray examination apparatus as claimed in claim 9, characterized in that the dielectric layer consists mainly of glass.

12. An X-ray examination apparatus as claimed in claim 1, characterized in that the dielectric layer is impervious to the X-ray absorbing liquid.

13. An X-ray examination apparatus as claimed in claim 12, characterized in that the dielectric layer consists mainly of glass.

14. An X-ray examination apparatus as claimed in claim 1, characterized in that the relative dielectric constant of the dielectric layer has a value in the interval [1,20], preferably in the interval [2,10].

15. An X-ray examination apparatus as claimed in claim 1, characterized in that the dielectric layer consists mainly of glass.

16. An X-ray examination apparatus as claimed in claim 15, characterized in that the coating layer consists mainly of silane or siloxane.

17. An X-ray examination apparatus as claimed in claim 1, characterized in that the dielectric layer consists mainly of parylene or polystyrene.

18. An X-ray examination apparatus as claimed in claim 17, characterized in that the coating layer consists mainly of polyfluorohydrocarbon.

19. An X-ray examination apparatus as claimed in claim 1, characterized in that a bonding layer is provided between the dielectric layer and the coating layer and/or the metal layer.

20. An X-ray examination apparatus comprising an X-ray source, an X-ray detector, and a filter which is arranged therebetween and comprises a plurality of filter elements having an X-ray absorptivity which can be adjusted by controlling a quantity of X-ray absorbing liquid within individual filter elements, characterized in that individual filter elements comprise a wall provided with a metal layer, and a polyfluorohydrocarbon coating layer is provided on the side of the metal layer which faces the interior of the relevant filter element.

* * * * *